(12) United States Patent
Chadbourne et al.

(10) Patent No.: US 8,736,227 B2
(45) Date of Patent: May 27, 2014

(54) PERIPHERAL DEVICE HOST CHARGING

(75) Inventors: Peter Chadbourne, Portland, ME (US); Gregory Maher, Cape Elizabeth, ME (US)

(73) Assignee: Fairchild Semiconductor Corporation, San Jose, CA (US)

( * ) Notice: Subject to any disclaimer, the term of this patent is extended or adjusted under 35 U.S.C. 154(b) by 561 days.

(21) Appl. No.: 12/714,054

(22) Filed: Feb. 26, 2010

(65) Prior Publication Data
US 2010/0219790 A1 Sep. 2, 2010

Related U.S. Application Data

(60) Provisional application No. 61/156,196, filed on Feb. 27, 2009.

(51) Int. Cl.
*H02J 7/00* (2006.01)

(52) U.S. Cl.
USPC .......................................... 320/107; 320/114

(58) Field of Classification Search
USPC ....................................................... 320/107
See application file for complete search history.

(56) References Cited

U.S. PATENT DOCUMENTS

| | | | | |
|---|---|---|---|---|
| 6,665,801 B1 * | 12/2003 | Weiss | ............................. | 713/300 |
| 2004/0164708 A1 * | 8/2004 | Veselic et al. | .................. | 320/132 |
| 2007/0024239 A1 | 2/2007 | Park | | |
| 2007/0067659 A1 | 3/2007 | Tevanian, Jr. | | |
| 2009/0033278 A1 | 2/2009 | Ludtke | | |

FOREIGN PATENT DOCUMENTS

| | | |
|---|---|---|
| WO | WO-2008131486 A1 | 11/2008 |
| WO | WO-2010099483 A2 | 9/2010 |
| WO | WO-2010099483 A3 | 1/2011 |

OTHER PUBLICATIONS

"International Application Serial No. PCT/US2010/025649, Search Report mailed Oct. 8, 2010", 5 pgs.
"International Application Serial. No. PCT/US2010/025649, Written Opinion mailed Oct. 8, 2010", 4 pgs.

* cited by examiner

*Primary Examiner* — Drew A Dunn
*Assistant Examiner* — Robert Grant
(74) *Attorney, Agent, or Firm* — Schwegman, Lundberg & Woessner, P.A.

(57) ABSTRACT

This document discusses, among other things, a charging emulator configured to be coupled to an electrical interface, the charging emulator including a control circuit configured to receive information about a peripheral device coupled to the electrical interface and a charger circuit configured to provide power to the electrical interface using the received peripheral device information. In an example, the charging emulator can include a component of a host device including a low-power state, and the charger circuit can be configured to provide power to the electrical interface when the host device is in the low-power state.

24 Claims, 7 Drawing Sheets

PERIPHERAL DEVICE HOST CHARGING

CROSS-REFERENCE TO RELATED APPLICATIONS

This application claims the benefit under 35 U.S.C. 119(e) of U.S. Provisional Application No. 61/156,196, filed on Feb. 27, 2009, which is hereby incorporated by reference in its entirety.

BACKGROUND

A peripheral device (e.g., a mobile handheld device, a portable music player, etc.) can be powered or charged using an electrical interface (e.g., a serial bus, such as a Universal Serial Bus (USB) connection or other serial bus, a parallel bus, etc.) of a dedicated charger or of a host device (e.g., a personal computer (PC), a mobile handheld device, etc.).

OVERVIEW

In an example, an electrical interface (e.g., a USB connection, etc.) can transfer power or data between a host device and a peripheral device. In certain examples, the electrical interface can include a component of the host device, and can emulate a charging port or a dedicated charger for the peripheral device. In various examples, the host device can include a desktop personal computer (PC), a notebook PC, a docking station, a mobile handheld device, or one or more other electronic devices.

The present inventors have recognized, among other things, that the electrical interface can supply power to the peripheral device from the host device when the host device is in a low-power state (e.g., sleep, suspended, hibernation, stand-by, off, or one or more other low-power states). In an example, the electrical interface can supply power to the peripheral device when a portion of the host device (e.g., a processor, a graphical user interface (GUI), or other portion of the host device) is in a low-power state. In certain examples, the electrical interface can supply power to the peripheral device from the host device while the host device is one or more other states (e.g., full-power state, etc.).

The present inventors have further recognized that the electrical interface can change between various modes of operation depending on a type or state of the peripheral device. In an example, the electrical interface can receive information about the peripheral device (e.g., from the peripheral device), and can emulate one or more different charging characteristics associated with different peripheral devices using the received information about the peripheral device. In an example, the information can include whether the peripheral device is coupled to the electrical interface, an identity or type of the peripheral device, or one or more charging characteristics associated with the peripheral device. For example, the electronic interface can be configured to alter or provide one or more different voltages, currents, power, charging times, etc., using the received information about the peripheral device across one or more pins or connections.

In Example 1, an apparatus includes a control circuit configured to receive information about a peripheral device coupled to an electrical interface and a charging emulator configured to be coupled to the electrical interface, the charging emulator configured to configure the electrical interface to charge the peripheral device using the received peripheral device information.

In Example 2, Example 1 optionally includes the electrical interface configured to couple to the peripheral device.

In Example 3, the electrical interface of any one or more of Examples 1-2 optionally includes a Universal Serial Bus (USB) interface.

In Example 4, any one or more of Examples 1-3 optionally includes a charger circuit configured to provide power to the electrical interface using the received peripheral device information.

In Example 5, any one or more of Examples 1-4 optionally includes a host device, wherein the host device includes an electronic device including a low-power state, wherein the host device includes the charging emulator, and wherein the charger circuit is configured to provide power to the electrical interface when the host device is in the low-power state.

In Example 6, the control circuit of any one or more of Examples 1-5 is optionally configured to receive information about the peripheral device when the host device is in the low-power state.

In Example 7, the low-power state of any one or more of Examples 1-6 optionally includes at least one of a hibernation, a stand-by, a sleep, a suspended, or an off state.

In Example 8, the host device of any one or more of Examples 1-7 optionally includes a personal computer (PC) including a processor, and wherein the low-power state of any one or more of Examples 1-7 optionally includes a state where the processor is off or in a hibernation, a stand-by, a sleep, or a suspended state.

In Example 9, the control circuit of any one or more of Examples 1-8 is optionally configured to determine a characteristic of the peripheral device coupled to the electrical interface using the received peripheral device information, wherein the charging emulator of any one or more of Examples 1-8 is optionally configured to configure the electrical interface using the determined characteristic.

In Example 10, any one or more of Examples 1-9 optionally includes a charger circuit configured to provide power to the electrical interface using the determined characteristic, wherein the characteristic of the peripheral device includes a charging characteristic In Example 11, the information about the peripheral device coupled to the electrical interface of any one or more of Examples 1-10 optionally includes a current draw of the peripheral device.

In Example 12, a system includes a host device including an electronic device including a low-power state, the low-power state including at least one of a low-power, a hibernation, a stand-by, a sleep, or a suspended state, the host device including an electrical interface configured to couple to a peripheral device, a control circuit configured to determine a charging characteristic of the peripheral device, and a charging emulator coupled to the electrical interface, the charging emulator configured to be operable when the host device is in the low-power state and to configure the electrical interface to charge the peripheral device using the determined charging characteristic, the charging emulator including a charger circuit configured to provide power to the electrical interface using the determined charging characteristic.

In Example 13, the control circuit of any one or more of Examples 1-12 is optionally configured to determine the charging characteristic of the peripheral device when the host device is in the low-power state.

In Example 14, the charger circuit of any one or more of Examples 1-13 is optionally configured to provide power to the electrical interface, using the determined charging characteristic, when the host device is in the low-power state.

In Example 15, the electrical interface of any one or more of Examples 1-14 optionally includes a Universal Serial Bus (USB) interface.

In Example 16, the host device of any one or more of Examples 1-15 optionally includes a personal computer (PC) including a processor, wherein the low-power state of any one or more of Examples 1-15 optionally includes a state where the processor is off or in a hibernation, a stand-by, a sleep, or a suspended state.

In Example 17, a method includes receiving information about a peripheral device coupled to an electrical interface, and configuring the electrical interface to charge the peripheral device using the received peripheral device information.

In Example 18, any one or more of Examples 1-17 optionally includes determining a characteristic of the peripheral device using the received peripheral device information, wherein the configuring the electrical interface to charge the peripheral device of any one or more of Examples 1-17 optionally includes using the determined characteristic.

In Example 19, any one or more of examples 1-18 optionally includes providing power to the electrical interface using the received peripheral device information.

In Example 20, the electrical interface of any one or more of Examples 1-19 optionally includes a Universal Serial Bus (USB) interface coupled to a charging emulator, wherein the providing power to the electrical interface of any one or more of Examples 1-19 optionally includes providing power to the USB interface.

In Example 21, the providing power to the electrical interface of any one or more of Examples 1-20 optionally includes using a host device, wherein the providing power to the electrical interface of any one or more of Examples 1-20 optionally includes providing power when the host device is in a low-power state.

In Example 22, any one or more of Examples 1-21 optionally includes determining a characteristic of the peripheral device using the received peripheral device information, wherein the providing power to the electrical interface using the received peripheral device information of any one or more of Examples 1-21 optionally includes using the determined characteristic.

In Example 23, the receiving information about the peripheral device of any one or more of Examples 1-22 optionally includes receiving information about the peripheral device when the host device is in the low-power state, wherein the low-power state of any one or more of Examples 1-22 optionally includes at least one of a low-power, a hibernation, a stand-by, a sleep, or a suspended state.

In Example 24, the host device of any one or more of Examples 1-23 optionally includes a personal computer (PC) including a processor, wherein the low-power state of any one or more of Examples 1-23 optionally includes a state where the processor is off or in a hibernation, a stand-by, a sleep, or a suspended state.

In Example 25, the receiving the peripheral device information of any one or more of Examples 1-24 optionally includes measuring a current draw of the peripheral device, wherein the providing power to the electrical interface of any one or more of Examples 1-24 optionally includes providing voltage to the peripheral device in a first mode if the measured current draw is above a threshold and providing voltage to the peripheral device in a second mode if the measured current draw is below the threshold.

In Example 26, the electrical interface of any one or more of Examples 1-25 optionally includes a Universal Serial Bus (USB) Type-A interface coupled to a charging emulator, the providing power to the electrical interface of any one or more of Examples 1-25 optionally includes providing power to the USB interface, and the providing voltage to the peripheral device in the first mode of any one or more of Examples 1-25 optionally includes in a USB mode and in the second mode includes in a proprietary device mode using a voltage divider.

In Example 27, a method includes detecting a peripheral device attach, measuring a current draw of the peripheral device, providing voltage to the peripheral device in a first mode if the measured current draw is above a threshold, and providing voltage to the peripheral device in a second mode if the measured current draw is below the threshold.

In Example 28, a method includes detecting a peripheral device attach, measuring a current draw of the peripheral device, providing voltage to the peripheral device as a USB device if the measured current draw is above a threshold, and providing voltage to the peripheral device using a voltage divider if the measured current draw is below the threshold.

In Example 29, a method includes detecting a peripheral device attach, measuring a current draw of the peripheral device a predetermined amount of time after detecting the peripheral device attach, providing voltage to the peripheral device using a voltage divider if the measured current draw is below the threshold, bringing a bus voltage low, and then bringing a bus voltage high.

In Example 30, a method includes detecting a peripheral device attach, measuring a current draw of the peripheral device a predetermined amount of time after detecting the peripheral device attach, providing voltage to the peripheral device using a voltage divider if the measured current draw is below the threshold, bringing a bus voltage low and then bringing a bus voltage high, and discontinuing providing voltage to the peripheral device using the voltage divider a predetermined amount of time after bringing the bus voltage high if the current draw remains below the threshold.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, a charging emulator, such as a USB charger having dedicated charging port emulation. In an example, the charging emulator can be integrated into a host device. In certain examples, the charging emulator can operate while the host device is in a low-power state (e.g., sleep, suspended, hibernation, stand-by, off, or one or more other low-power states). The charging emulator can configure an electrical interface to appear as one or more of a dedicated charging port (DCP), a standard downstream port (SDP), or a charging downstream port (CDP), as defined by the USB Implementers Forum (USB-IF) Battery Charging Specification. In other examples, the charging emulator can configure the electrical interface to appear as one or more other chargers (e.g., one or more proprietary chargers, etc.). In an example, the charging emulator can reconfigure the electrical interface within a set period of time to appear as another type of charger based upon the current drawn from a connected peripheral or slave device. In certain examples, the charging emulator can optionally operate as a power field effect transistor (FET), such as when the host device is not in one or more low-power states.

In certain examples, various peripheral devices attached to an electronic interface during certain host device (e.g., desktop PCs, notebook PCs, docking stations, etc.) low-power states (e.g., no baseband communication, processor in a low-power or off state) are unable to be charged.

The present inventors have recognized, among other things, a control circuit configured to receive information about a peripheral device coupled to an electrical interface and, in certain examples, distinguish between various peripheral devices (e.g., high-power and low-power peripheral devices, etc.) using the received peripheral device information, and a charging emulator configured to configure the electrical interface to charge the peripheral device using the received peripheral device information. In an example, a charger circuit can be configured to provide charging capability to the electrical interface, or peripheral device, even when a host device is in a low-power state.

Figure 1:
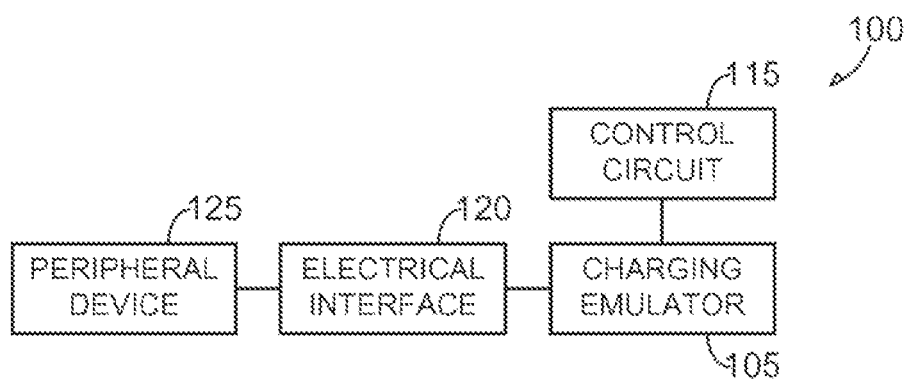
FIG. 1 illustrates generally an example of a system including a charging emulator, a control circuit, an electrical interface, and a peripheral device.

FIG. 1 illustrates generally an example of a system 100 including a charging emulator 105, a control circuit 115 coupled to the charging emulator 105, an electrical interface 120 coupled to the charging emulator 105, and a peripheral device 125 coupled to the electrical interface 120.

In an example, the control circuit 115 can be configured to receive information about the peripheral device 125 coupled to the electrical interface 120, and the charging emulator 105 can be configured to configure the electrical interface 120 to charge the peripheral device using the received peripheral device information. In an example, the peripheral device information can include information from the peripheral device 125, such as a current draw from one or more component of the charging emulator 105, or one or more other characteristic (e.g., a charging characteristic) of the peripheral device 125. For example, the charging emulator 105 can be configured to provide different charging modes depending on the received peripheral device information. In certain examples, the charging modes can include one or more different USB charging modes, such as described USB-IF Battery Charging Specification, or one or more different proprietary charge modes (e.g., providing different voltages on data lines D+ or D−, for example, using a voltage divider).

In certain examples, one or more of the charging emulator 105, the control circuit 115, the electrical interface 120, or one or more other components can be included in a host device. In an example, the host device can include a low-power mode, and the charging emulator 105 and the control circuit 115 can be configured to be operable when the host device is in the low-power state.

Figure 2:
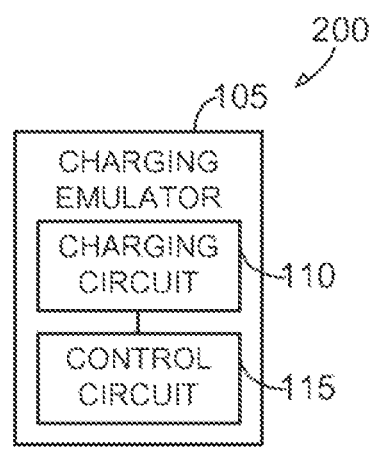
FIG. 2 illustrates generally an example of a system including a charging emulator, a charging circuit, and a control circuit.

FIG. 2 illustrates generally an example of a system 200 including a charging emulator 105, a charging circuit 110, and a control circuit 115. In this example, the charging emulator 105 includes the control circuit 115 and the charging circuit 110. In other examples, the charging emulator 105 can include one or more other components.

In an example, the charging circuit 110 can be configured to provide power to the electrical interface (e.g., the electrical interface 120) using received peripheral device information. In an example, the charger circuit 110 can be configured to provide power to the electrical interface when the host device in a low-power state. In certain examples, the charging circuit 110 can include a USB Power Switch, a FET, a regulator, or one or more other components.

Figure 3:
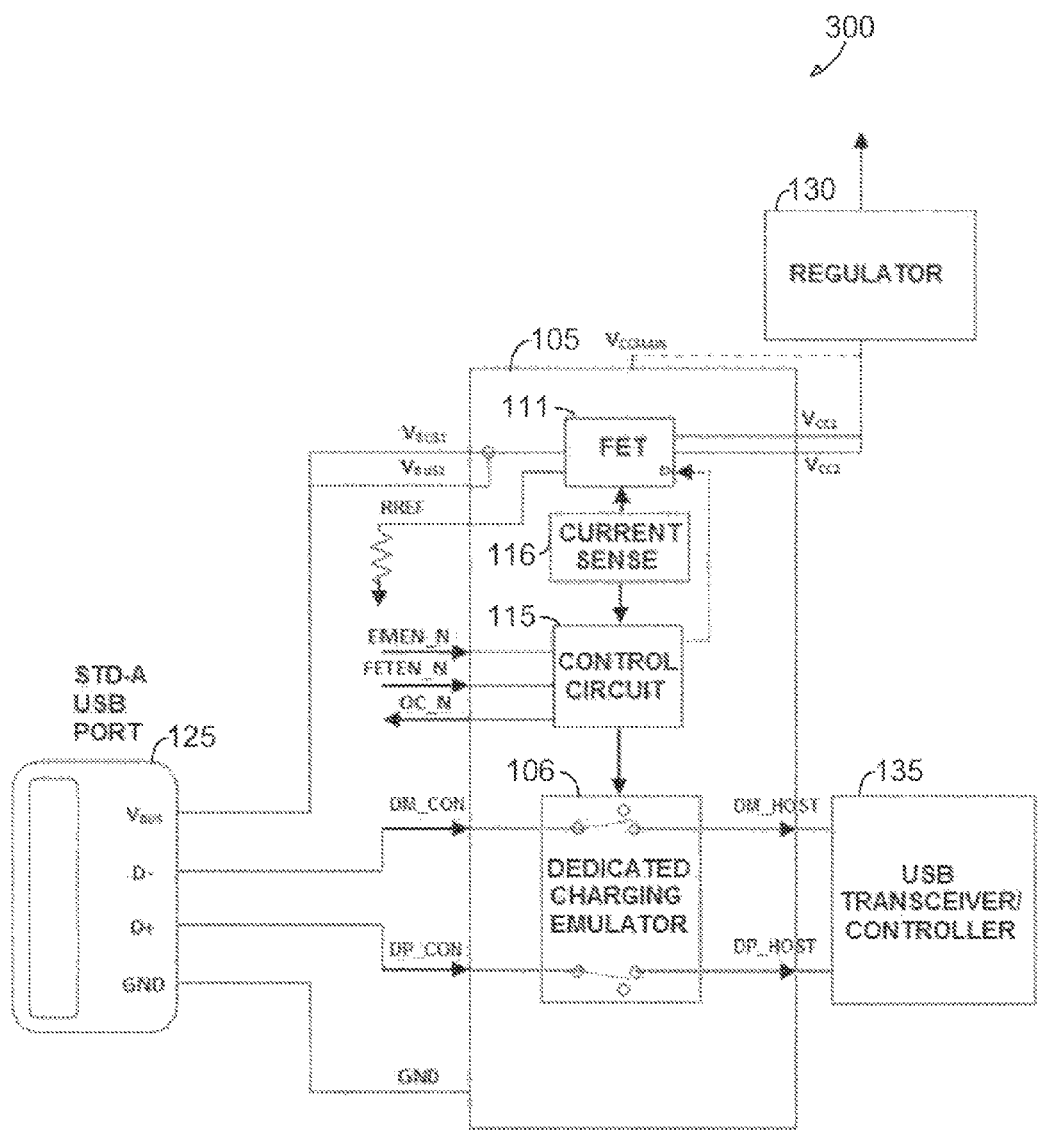
FIGS. 3 and 4 illustrate generally examples of systems including a charging emulator and an electrical interface.
Figure 4:
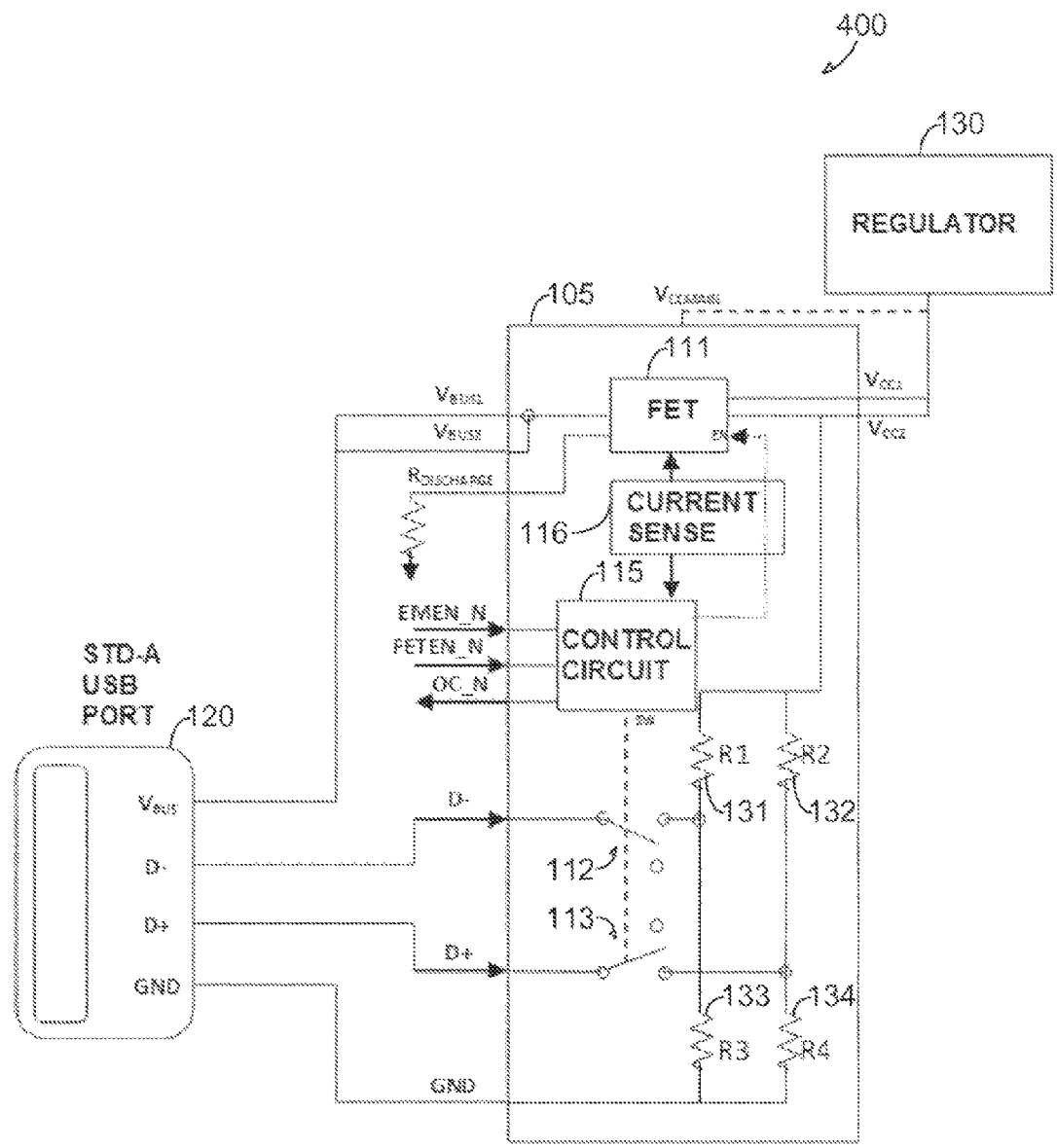

FIGS. 3 and 4 illustrate generally examples of systems 300, 400 including a charging emulator 105 and an electrical interface 120 (e.g., a Type-A standard USB interface).

In certain examples, the one or more components of the systems, apparatus, or methods described herein can be configured to sense a peripheral device attached to an electrical interface, to determine if the peripheral device is a USB powered or other type of device, distinguish between different types of USB powered devices, to configure the electrical interface to look or act like an appropriate charger for the attached peripheral device, to provide various current levels (e.g., depending on one or more requirements of the peripheral device, etc.), to sense detachment of the peripheral device from the electronic interface or a charging stop of the peripheral device, reset to search for a peripheral device attach, or to look or act like a normal USB port and provide charging capability (e.g., when the host device is in a full-power or power-on state).

In an example, the charging emulator can include a USB dedicated charging port emulator with a pass through and a power switch. In certain examples, the USB dedicated charging port emulator can be used in notebook PCs, docking stations, desktop PCs, or one or more other computing devices or peripherals.

In certain examples, the charging emulator can include a DCP or an Apple® USB Power Adapter using the D+ and D− lines of a USB connector and can allow for charging of substantially all USB peripheral devices. In an example, a control circuit can determine which type of charger emulation charges an attached peripheral device at a higher rate. In an example, the charging emulator can include an integrated USB power switch. The charging emulator can control a $V_{BUS}$ FET to allow connected portable devices to re-enumerate.

In certain examples, the charging emulator or one or more other component of the systems, apparatus, or methods described herein can include an output discharge function (e.g., a resistor to ground), thermal or short circuit protection, a 400 µs switch rise/fall time, undervoltage lockout, an overcurrent indicator (e.g., no false glitches on power-up). Moreover, in various examples, traditional USB functionality is not disturbed when the charging emulator is disabled, a USB power switch can be functional with the charging emulator disabled, or D+ and D− can be pass-through capable when the charging emulator mode is off.

USB Implementers Forum (USB-IF) Battery Charging Specification

As referred to above, the charging emulator can configure the electrical interface to appear as one or more of a USB charging port, such as a dedicated charging port (DCP) or a charging downstream port (CDP), or a USB downstream port, such as a standard downstream port (SDP) or the CDP, for example, as defined by the USB Implementers Forum (USB-IF) Battery Charging Specification (e.g., Revision 1.1).

In an example, a DCP is a downstream port on a device that outputs power through a USB connector, but is not capable of enumerating a downstream device. A DCP can be required to output a minimum current of 0.5 A-1.5 A and an average voltage of 4.75V-5.25V on $V_{BUS}$ and short D+ to D−.

In an example, a CDP is a downstream port on a device that, when not in a USB session (e.g., transferring data), can be required to output 0.5V-0.7V on D− when between 0.25V and 2V is sensed on D+, and to output 0.5 A on $V_{BUS}$ at any time.

In an example, an SDP is a downstream port on a device expected to draw less than 2.5 mA average when unconnected or suspended, up to 100 mA maximum when connected and not suspended, and up to 500 mA maximum if configured and not suspended. A downstream device can be enumerated when connected to the SDP. Further, the SDP can be required to pull D+ and D− to ground (e.g., through a resistor, such as a 15 kΩ resistor). In certain examples, the SDP can detect when a peripheral device is driving D+ to 0.5V-0.7V and react in some fashion (e.g., outputting a voltage on D−, switching modes, etc.).

In certain examples, both the CDP and the SDP are downstream ports on a device that comply with the USB 2.0 definition of a host or a hub.

In other examples, the charging emulator can be configured the electrical interface as one or more other chargers (e.g., an Apple® USB Power Adapter, etc.). Further, the present inventors have recognized that the systems, apparatus, or methods disclosed herein can be configured to adopt future changes, such as in future changes to the USB-IP Batter Charging Specification.

When enabled on a USB port, the charging emulator, or a control circuit coupled to the charging emulator, can detect when a peripheral device to be charged is plugged in and determine an appropriate emulation mode (e.g., the emulation mode that will charge the peripheral device at the higher rate).

In an example, the charging emulator can also be disabled. When disabled, the charging emulator can appear invisible to the electrical interface (e.g., the USB port), leaving the $V_{BUS}$ Power Switch enabled and allowing a controller (e.g., a USB controller) to perform standard USB applications (e.g., data transfer). In this mode, the D+ and D− signals can also pass through a charging emulator to a USB transceiver for full USB operation and compliance.

In some examples, the charging emulator can include a USB Power Switch that can operate in all emulator modes. In an example, the USB Power Switch can be capable of supplying up to 1.8 A or more (e.g., per USB Dedicated Charger requirements). Other current amounts and ranges are possible as well. In other examples, the USB Power Switch can also feature one or more of an undervoltage lockout, thermal or short circuit protection, or an output discharge function.

Peripheral Device Attachment/Detachment Detection

In an example, a charging emulator can be configured to detect peripheral device attachment to an electrical interface. In one example, attachment can be detected by sensing a current draw by the peripheral device. In an example, following a detected attachment, the charging emulator, or one or more other components, can be configured to wait for a period of time (e.g., one or more seconds) and monitor the current draw by the peripheral device. In an example, if the current draw exceeds a threshold (e.g., greater than 150 mA, greater than 100 mA, etc.), the charging emulator can remain in a regular USB charge mode. If the measured current draw is below the threshold, the charging emulator can switch to a second charge mode (e.g., an Apple® USB charge mode, etc.).

In an example, the second charge mode can include using a voltage divider to provide differing voltage values across various pins in electrical interface (e.g., D+ and D− of the USB port). In an example, after a switch to the second charge mode, the charging emulator can wait for a second period of time (e.g., 2.5 seconds or more) and again monitor the current draw by the peripheral device. In an example, if the current draw exceeds a threshold, then the charging emulator can remain in the second charge mode. If the measured current draw is below the threshold, the charging emulator can return to a regular USB charge mode.

In certain examples, the charging emulator can be configured to detect peripheral device detachment to the electrical interface. For example, if the charging emulator, or one or more other components, measures a current draw by the peripheral device to be below a detach threshold (e.g., 5 mA-20 mA, etc.), it can treat the peripheral as detached. In an example, the charging emulator can switch to a regular USB charge mode after a detected detachment.

Example Charging Emulator Operation

FIG. 3 illustrates generally an example of a system 300 including a charging emulator 105 including a FET 111, a current sense 115, a control circuit 115, and a dedicated charging modulator 106. In an example, the charging emulator 105 can be coupled to an electronic interface 125, a regulator 130, and a USB transceiver/controller 135. In an example, the current sense 115 can be included as a component of the control circuit 115.

In an example, the charging emulator 105, when enabled (e.g., using EMEN_N), can monitor the $V_{BUS}$ line for a peripheral device attach (e.g., using the control circuit 115 and the current sense 116). Once the charging emulator 105 detects that a peripheral device has attached, it can determine if emulating one or more USB chargers or one or more other chargers (e.g., an Apple® USB Power Adapter, etc.) is more effective for the attached peripheral device. If the peripheral device is not trying to charge from the charging emulator 105, the charging emulator 105 will default to USB emulation mode.

The charging emulator 105 can remain in this mode until current stops flowing, signaling that the peripheral device is either fully charged or has been device has been removed. Once this occurs, the emulator will reset to USB Dedicated Charger mode and look for the next device attach. The USB Power Switch will remain on.

In an example, the charging emulator 105 can be disabled by bringing EMEN_N low. In this mode, the USB Power Switch (e.g., the FET 111) can remain on, keeping $V_{BUS}$ on and the D+ or D− switches in pass through mode. In this mode, the D+ and D− signals can also pass through the charger device to the USB transceiver/controller 135 for full USB operation and compliance.

In an example, the FET 111 can be configured to handle USB $V_{BUS}$ requirements for one or more different USB chargers, as well as meet the requirements for charging one or more other proprietary peripheral devices (e.g., iPod®, iPhone®, etc.). Because the FET 111 must meet USB DCP requirements, the current limits are higher than USB SDP requirements. The FET 111 can operate over a range of 2.7V to 5.5V, in certain examples, having a controlled rise and fall times of 400 μs (nominal).

In certain examples, the FET 111 can be manually enabled using the FETEN_N input. A low on FETEN_N pin can enable the FET 111. A high on FETEN_N can disable the FET 111 and discharge the $V_{BUS1}$ and $V_{BUS2}$ outputs through $R_{REF}$ (e.g., a 100 ohm resistor) so the level on $V_{BUS}$ can quickly go low, allowing devices to respond quicker.

In an example, the FET 111 can provide Under Voltage Lockout to guarantee that the switch is off at power-up. In an example, the switch will not turn on until 2V is reached on $V_{CC1/2}$, and in certain examples, will also turn off when $V_{CC1/2}$ falls below the 2V level.

In an example, the charging emulator 105 can provide two types of overcurrent limiting. First, if a short-circuit is detected, the charging emulator will limit current flow at 500 mA, nominally. If current gradually increases beyond recommend operating condition, it can be limited to 2.5 A, nominally. In either case, current will continue to flow until thermal protection shuts down the switch. In an example, the OC_N indicator pin can be pulled low during an overcurrent event.

Further, thermal protection can be provided to guard against damaging the charging emulator 105 during short-circuit or over-load conditions. In an example, the FET 111 can be disabled when the junction temperature reaches 135 degrees C., and the OC_N indicator pin can be pulled low. The FET 111 can be re-enabled when the device junction temperature falls back below 125 C.

When an overcurrent or overtemperature shutdown condition exists, the OC_N pin can go low and remain low until the shutdown condition goes away. In an example, to prevent false triggering in an overcurrent situation, the shutdown can only be asserted or deasserted after a 10 ms de-glitch time period.

In an example, the system 300 can include an internal resistor $R_{REF}$ to discharge $V_{BUS}$ when the Power Switch (the FET 111) is turned off. This can allow a connected peripheral device to more quickly detect that $V_{BUS}$ has been removed.

In certain examples, stresses exceeding any absolute maximum ratings can damage a device. The device may not function or be operable above the recommended operating conditions and stressing the parts to these levels is not recommended. In addition, extended exposure to stresses above the recommended operating conditions can affect device reliability.

Table 1, below, illustrates generally example maximum ratings for the systems, apparatus, and methods disclosed herein.

TABLE 1

Example Maximum Ratings

| Symbol | Parameter | | Min. | Max. | Unit |
|---|---|---|---|---|---|
| $V_{CC}$ | Supply Voltage | | −0.5 | 6.0 | V |
| $V_{IN}$ | DC Input Voltage | | −0.5 | 6.0 | V |
| $V_{OUT}$ | DC Output Voltage | | −0.5 | 6.0 | V |
| $I_{IK}$ | Input Clamp Diode Current, @ $V_{IN}$ < −0.5 V, $V_{IN}$ > 6 V | | −50 | | mA |
| $I_{OK}$ | Output Clamp Diode Current, @ $V_{IN}$ < −0.5 V, $V_{IN}$ > 6 V, $V_{CC}$ = GND | | −50 | | mA |
| $T_{STG}$ | Storage Temperature Range | | −65 | +150 | ° C. |
| $T_J$ | Maximum Junction Temperature | | | +150 | ° C. |
| $T_L$ | Lead Temperature (Soldering, 10 Seconds) | | | +260 | ° C. |
| ESD | IEC 61000-4-2 System ESD USB Connector | Air gap | 15 | | kV |
| | pins (D+, D−, $V_{BUS}$) | Contact | 8 | | |
| | JEDEC JESD22-A114, Human Body Model | All Pins | 2 | | |
| | JEDEC JESD22-C101, Charged Device Model | All Pins | 1 | | |

Table 2, below, illustrates generally example operating conditions for the systems, apparatus, and methods disclosed herein.

TABLE 2

Example Operating Conditions

| Symbol | Parameter | Min. | Max. | Units |
|---|---|---|---|---|
| $V_{CCMAIN}$ | Supply Voltage | 4.5 | 5.5 | V |
| $V_{CC1}, V_{CC2}$ | Supply Voltage | 2.7 | 5.5 | V |
| $V_{IN}$ | Input Voltage | 0 | $V_{CC}$ | V |
| $V_{OUT}$ | Output Voltage | 0 | $V_{CC}$ | V |
| $I_{OUT}$ | Continuous Output Current | 0 | 2.1 | A |
| $T_A$ | Operating Temperature | −40 | +85 | ° C. |

Table 3, below, illustrates generally example switch path DC electrical characteristics for the systems, apparatus, and methods disclosed herein.

TABLE 3

Example Switch Path DC Electrical Characteristics

| Symbol | Parameter | $V_{CC}$ (V) | Conditions | $T_A = -40$ to $+85°$ C. A | B | C | Unit |
|---|---|---|---|---|---|---|---|
| | | | USB Data Switch | | | | |
| $I_{OFF}$ | Power Off Leakage Current | 0 | All Data Ports except Video, ID Bypass and MIC $V_{SW} = 0$ V to 4.4 V | | | 10 | μA |
| | USB Analog Signal Range | 5.0 | | 0 | | 3.6 | V |
| $R_{ONUSB}$ | HS Switch On Resistance(Error! Reference source not found.) | 5.0 | $V_{D+/D-} = 0$ V, 0.4 V, $I_{ON} = 8$ mA | | 6 | 8 | Ω |
| | | | USB Power Switch | | | | |
| $R_{DS(ON)}$ | USB Power Switch On Resistance | 5.0 | $I_{OUT} = 1.8$ A | | 70 | 100 | mΩ |
| $I_{OS}$ | Short Circuit Output Current | 5.0 | $V_{BUS1}, V_{BUS2}$ connected to GND | TBD | 0.5 | TBD | A |
| $I_{OCTHRESH}$ | Overcurrent Trip Threshold | 5.0 | Current ramp less than 100 A/s on $V_{BUS1}, V_{BUS2}$ | 1.9 | 2.5 | 3.0 | A |
| | | | Under Voltage Lockout (UVLO) | | | | |
| $V_{IN(VCCx)}$ | Under Voltage Lockout Theshold | | | 2.2 | | 2.7 | V |
| $V_{HYST}$ | UVLO Hysteresis | | | | 200 | | mV |
| | | | Thermal Shutdown | | | | |
| $T_{SD}$ | Thermal Shutdown Threshold | | | | 135 | | C |
| $T_{REC}$ | Thermal Shutdown Recovery | | | | 125 | | C |
| $T_{HYST}$ | Thermal Shutdown Hysteresis | | | | 10 | | C |
| | | | Enable Pin Input, EMEN_N, FETEN_N | | | | |
| $V_{IH}$ | Input High Voltage | 2.7 to 5.5 | | 2 | | | V |
| $V_{IL}$ | Input Low Voltage | 2.7 to 5.5 | | | | 0.8 | V |
| | | | Overcurrent/OverTemperature Indicator Output, OC_N | | | | |
| $V_{OL}$ | Output Low Voltage | 2.7 to 5.5 | $I_{OL} = 10$ mA | | | 0.4 | V |
| | | | Current Characteristics | | | | |
| $I_{OFF}$ | Power Off Leakage Current | 0 | $V_{IN}$ or $V_{OUT} = 5.5$ V | | | 1 | μA |
| $I_{IN}$ | Input Leakage Current | 0 to 5.5 | $0 \leq V_{IN} \leq 5.5$ V | | | 0.2 | μA |
| $I_{CC}$ | Quiescent Current | 0 to 5.5 | $V_{IN(FETEN\_N)} = 5.5$ V, No load on $V_{BUS1}, V_{BUS2}$ | | 65 | 110 | μA |
| | | | $V_{IN(FETEN\_N)} = $ GND, No load on $V_{BUS1}, V_{BUS2}$ | | 0.5 | 5 | |

Table 4, below, illustrates generally example switch path AC electrical characteristics for the systems, apparatus, and methods disclosed herein.

TABLE 4

Example Switch Path AC Electrical Characteristics

| Symbol | Parameter | $V_{CC}$ (V) | Conditions | $T_A = -40$ to $+85°$ C. A | B | C | Unit |
|---|---|---|---|---|---|---|---|
| $T_{DEGLITCH}$ | USB Power Switch Deglitch Time | 5.0 | | 4 | | 15 | mS |
| $T_F$ | $V_{BUS1}, V_{BUS2}$ fall time | 5.0 | 10%-90%, $C_L = 1$ uF, $R_L = 5$ Ω | — | 600 | — | uS |
| | | 2.7 | 10%-90%, $C_L = 1$ uF, $R_L = 5$ Ω | | 400 | — | uS |
| $T_R$ | $V_{BUS1}, V_{BUS2}$ rise time | 5.0 | 90%-10%, $C_L = 1$ uF, $R_L = 5$ Ω | | 600 | — | uS |
| | | 2.7 | 90%-10%, $C_L = 1$ uF, $R_L = 5$ Ω | | 400 | — | uS |

TABLE 4-continued

Example Switch Path AC Electrical Characteristics

| Symbol | Parameter | $V_{CC}$ (V) | Conditions | $T_A = -40$ to $+85°$ C. A | B | C | Unit |
|---|---|---|---|---|---|---|---|
| $T_{ON}$ | USB Power Switch turn on time | 5.0 | $C_L = 1$ uF, $R_L = 5\ \Omega$ | | | 3 | mS |
| $T_{OFF}$ | USB Power Switch turn off time | 5.0 | $C_L = 1$ uF, $R_L = 5\ \Omega$ | | | 10 | mS |

Table 5, below, illustrates generally example capacitance for the systems, apparatus, and methods disclosed herein.

TABLE 5

Example Capacitance

| Symbol | Parameter | $V_{CC}$ (V) | Conditions | $T_A = -40$ to $+85°$ C. A | B | C | Unit |
|---|---|---|---|---|---|---|---|
| $C_{IN}$ | FETEN_N, EMEN_N Input Capacitance | 0 | $V_{BIAS} = 0.2$ V | | 2.5 | | pF |
| $C_{OUT}$ | OC_N Output Capacitance | 0 | $V_{BIAS} = 0.2$ V | | 2.5 | | pF |
| $C_{ON(D+,D-)}$ | D+, D− On Capacitance | 3.8 | $V_{BIAS} = 0.2$ V, f = 240 MHz | | 5.0 | | pF |
| $C_{OFF(D+,D-)}$ | D+, D− On Capacitance | 3.8 | $V_{BIAS} = 0.2$ V, f = 240 MHz | | 2.0 | | pF |

FIG. 4 illustrates generally an example 400 of a system including a charging emulator 105 including a FET 111, a control circuit 115, and a current sense 116. In this example, the charging emulator 105 includes first and second switches 112, 113 coupling the D+ and D− lines of the charging emulator 105 to a voltage divider including first, second, third, and fourth resistors 131, 132, 133, 134. The charging emulator is coupled to a regulator 130 and an electrical interface 120 (e.g., a Type-A standard USB port).

In an example, the voltage divider can be used in one or more charging modes to charge one or more proprietary peripheral devices (e.g., the Apple® USB Power Adapter). In an example, the Apple® USB Power Adapter uses a simple voltage divider on D+ and D− to identify itself. In an example, the Apple® USB Power Adapter can include the following values of resistors for the voltage divider: R1=43.2 kΩ, R2=75 kΩ, R3=49.9 kΩ and R4=49.9 kΩ. In other examples, other values of resistors can be used, or other voltage divider or other networks can be used, depending on the type of peripheral device.

Figure 5:
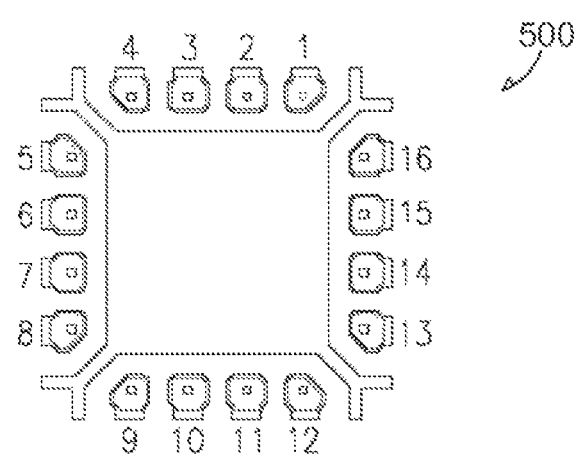
FIG. 5 illustrates generally an example of charging emulator package.

FIG. 5 illustrates generally an example of charging emulator package 500. Table 6, below, illustrates generally example pin descriptions for the systems, apparatus, and methods disclosed herein. In other examples, other packages or pin descriptions can be used.

TABLE 6

Example Pin Descriptions

| Pin | Name | Description |
|---|---|---|
| 1 | $V_{CCMAIN}$ | Device voltage supply pins, +5 V |
| 2 | NC1 | Factory Test Mode pin, do not connect |
| 3 | $V_{CC2}$ | Input voltage supply pin for $V_{BUS}$, +5 V |

TABLE 6-continued

Example Pin Descriptions

| Pin | Name | Description |
|---|---|---|
| 4 | $V_{CC1}$ | Input voltage supply pin for $V_{BUS}$, +5 V |
| 5 | $V_{BUS1}$ | $V_{BUS}$ signal connected to USB Connector port |
| 6 | $V_{BUS2}$ | $V_{BUS}$ signal connected to USB Connector port |
| 7 | DM_CON | D− signal connected to USB Connector port |
| 8 | DP_CON | D+ signal connected to USB Connector port |
| 9 | GND | Ground |
| 10 | DP_HOST | D+ signal connected to USB Host port |
| 11 | DM_HOST | D− signal connected to USB Host port |
| 12 | OC_N | Open Drain active low Overcurrent and Overtemperature shutdown indicator output |
| 13 | FETEN_N | Active low FET control input |
| 14 | EMEN_N | Active low Emulator control input |
| 15 | NC2 | Factory Test Mode pin, do not connect |
| 16 | $R_{REF}$ | Reference resistor for analog circuitry. A 1% TBD ohm resistor can be connected on this pin to ground |

Figure 6:
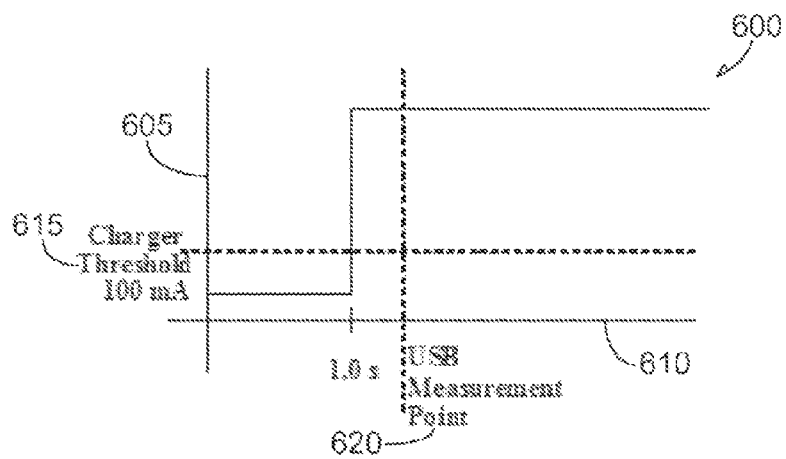
FIGS. 6 and 7 illustrate generally example relationships of charger emulator operation using current and time.
Figure 7:
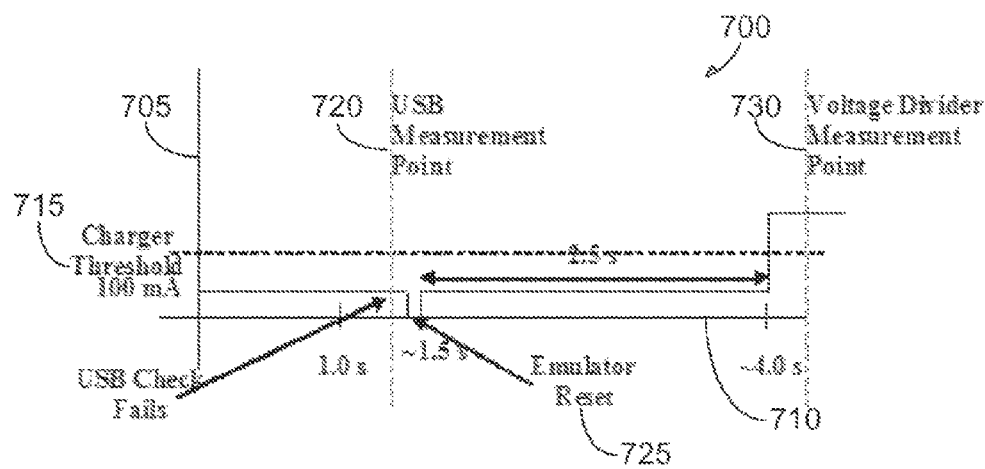

FIGS. 6 and 7 illustrate generally example relationships 600, 700 of charger emulator operation using current 605, 705 (in the vertical axis) and time 610, 710 (in the horizontal axis).

In FIG. 6, when the charging emulator is enabled, the current draw from $V_{BUS}$ can be monitored. Following a rise in detected current on $V_{BUS}$, the charging emulator can implement a USB charging mode (e.g., a D+ and D− short (e.g., with a value of less than 200Ω)). If, after a period of time (e.g., 1 second), such as a USB measuring point 620, the current is greater than a charger threshold 615 (e.g., 100 mA, 150 mA etc.), the charging emulator can remain in this USB charging mode and allow the attached peripheral device to charge.

In FIG. 7, after a period of time (a USB measuring point 720), the current is not greater than a charger threshold 715. Accordingly, the charging emulator can be reset (emulator reset 725) and switched to a different charging mode (e.g., from a USB charge mode to a proprietary charge mode, such as Apple® USB Power Adapter mode, etc.). In an example, a voltage divider network can be applied on the D+ and D− lines to emulate a proprietary adapter.

In an example, during the switch over, the FET on the $V_{BUS}$ line can be disabled. After the D+ and D− switch is complete, the FET can be re-enabled, signaling the peripheral device to re-enumerate. If, after a second period of time (a Voltage Divider measuring point 730), the current in this mode is greater than the charger threshold 715 (e.g., 100 mA, 150 mA, etc.), the switches can be kept in this mode. If the current is lower than the threshold 715 (e.g., 150 mA, etc.), the switches can return to USB mode, turning the FET off and then on again to allow the portable device to re-enumerate. In other examples, different thresholds can be used for the different charging modes.

The charging emulator can remain in this charging mode until current stops flowing, signaling that the peripheral device is fully charged or has been removed. Once this occurs, the D+ and D− switches can open until current is seen again. The FET can remain on while the current sense (or the control circuit) monitors for current.

In an example, the charging emulator can be disabled by bringing EMEN_N low. In this mode, the FET can remain on, keeping $V_{BUS}$ on and the D+ and D− switches open. In this configuration, the operation of the USB port will not be affected.

In certain examples, it can be advantageous to allow the peripheral device to draw current before making a determination regarding the peripheral device. For example, in USB mode, a delay of 1.3 s (e.g., at minimum, greater then 1.0 s) can be implemented before making the determination, and in voltage divider mode, a delay of 2.8 s (e.g., at minimum, greater then 2.5 s) can be implemented before making the determination. In other examples, FETEN_N can be active either LOW or HIGH.

Figure 8:
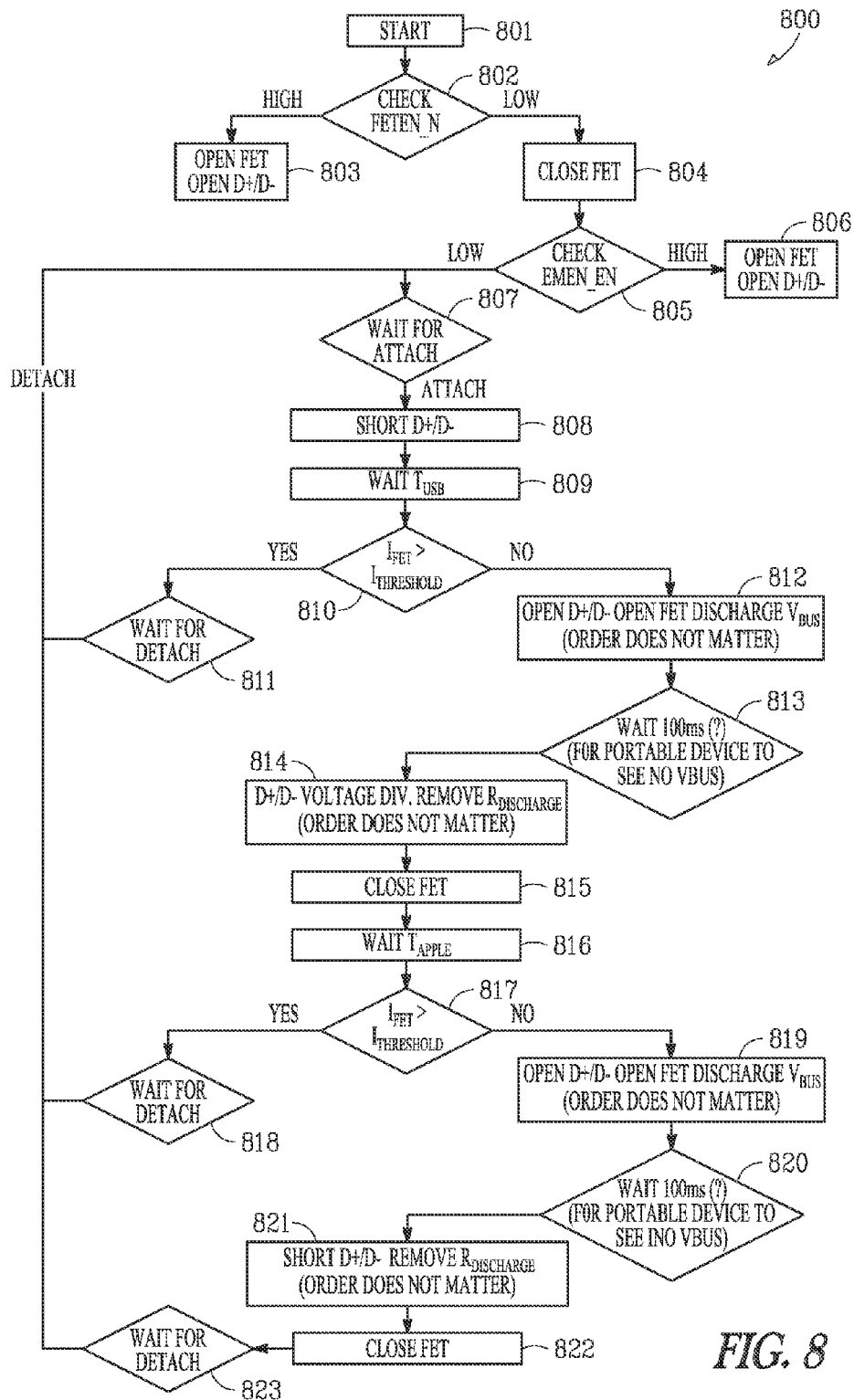
FIGS. 8 and 9 illustrate generally examples of methods of operating a charging emulator between various charging states.

FIG. 8 illustrates generally an example of a method 800 of operating a charging emulator between various charging states. In other examples, other charging states can be used.

Process starts at 801. At 802, FETEN_N is checked. If at 802 FETEN_N is high, then at 803 a FET (e.g., the Power Switch) and D+ and D− switches are opened. If at 802 FETEN_N is low, then at 804 the FET is closed.

At 805, EMEN_EN is checked. If at 805 EMEN_EN is high, then at 806 the D+ and D− switches are opened. If at 805 EMEN_EN is low, then at 807 the process waits for attachment. If at 807 attachment occurs, then at 808 the D+ and D− lines are shorted, and at 809, a first delay period is implemented. After the first delay period expires, at 810 a measured current is compared to a threshold. If at 810 the measured current exceeds the threshold, then at 811 the charging emulator waits for detach (e.g., a measured current to drop). Once detach occurs at 811, then at 807, the process waits for attachment, and continues from there. If at 810 the measured current does not exceed the threshold, then at 812 the FET and D+ and D− switches are opened and voltage on the FET is discharged.

At 813, a delay period is implanted. At 814, a voltage divider is coupled to the D+ and D− switches, and at 815, the FET is closed.

At 816, another delay is implemented. After the delay expires, at 817 a measured current is compared to a threshold. If at 817 the measured current exceeds the threshold, then at 818 the charging emulator waits for detach (e.g., measured current to drop). Once detach occurs at 818, then at 807, the process waits for attachment, and continues from there. If at 817 the measured current does not exceed the threshold, then at 819 the FET and D+ and D− switches are opened and voltage on the FET is discharged.

At 820, a delay period is implanted. At 821, the D+ and D− lines are shorted. At 822, the FET is closed, and at 823 the charging emulator waits for detach (e.g., a measured current to drop). Once detach occurs at 823, then at 807, the process waits for attachment, and continues from there.

Figure 9:
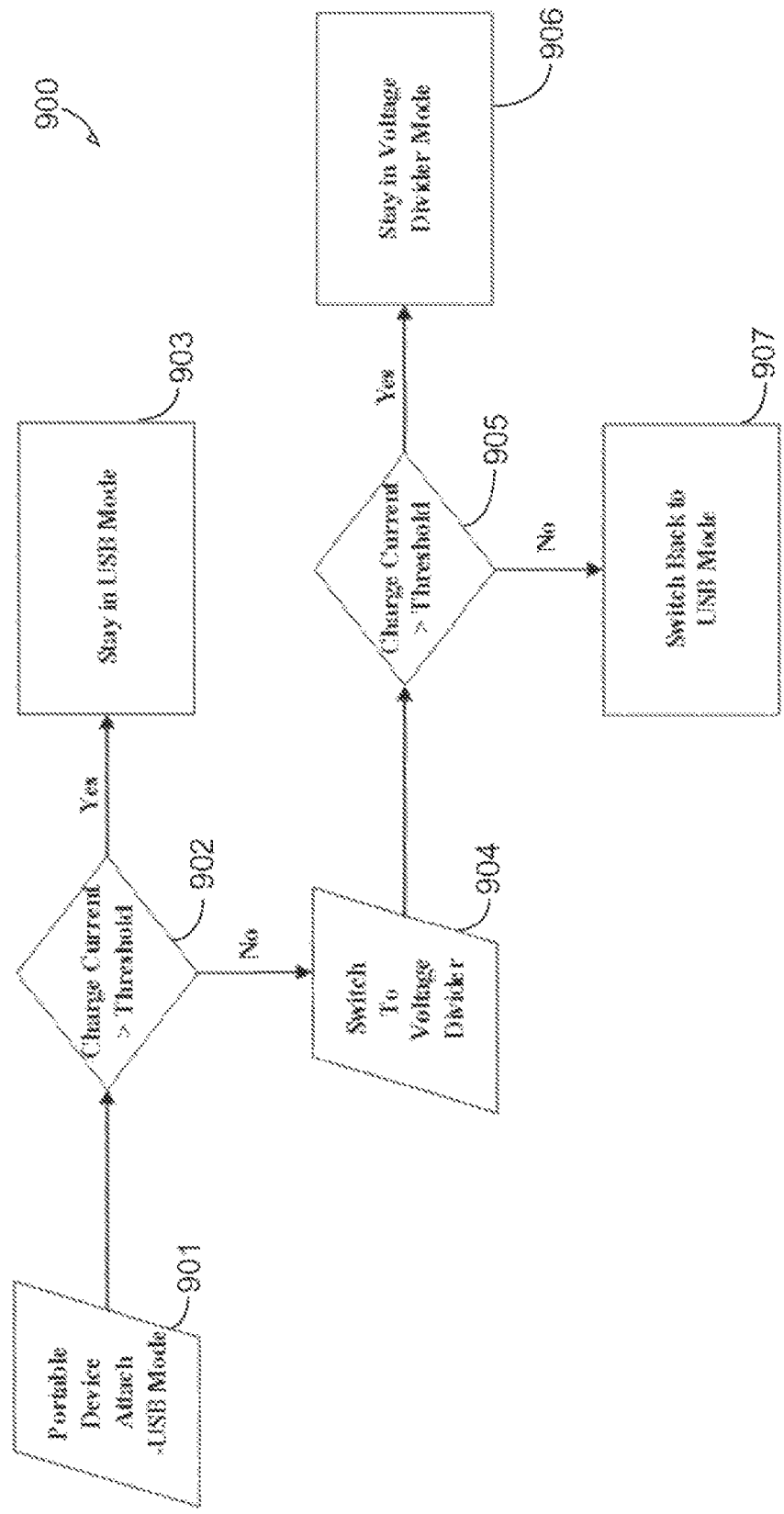

FIG. 9 illustrates generally an example of a method 900 of operating a charging emulator between various charging states. In other examples, other charging states can be used.

At 901, a portable device (e.g., a peripheral device) is attached to an electronic interface, and the charging emulator begins a USB charging mode.

At 902, the current draw from the portable device is measured and compared to a threshold. If at 902 the measured current is greater than the threshold, then at 903 the charging emulator stays in the USB charging mode. If at 902 the measured current is not greater than the threshold, then at 904 the charging emulator is switched to a different charging mode (e.g., a voltage divider charging mode, such as for an Apple® USB Power Adapter, or one or more other charging modes).

At 905, the current draw of the portable device is measured and compared to a threshold. If at 905 the measured current is greater than the threshold, then at 906 the charging emulator stays in the different charging mode. If at 905 the measured current is not greater than the threshold, then at 907 the charging emulator is switched back to the USB charging mode.

In other examples, one or more other charging modes can be rotated into the process, or substituted for one or more of the current charging modes. Further, information other than current draw can be received and used to make the determination of charging mode.

Other Examples

In an example, the Advanced Configuration and Power Interface (ACPI) specification defines seven power states for ACPI-compliant computer-systems:
 G0 (S0) Working;
 G1 (S1 through S4) Sleeping;
  S1 (e.g., all processor caches are flushed, and the central processing units (CPUs) stop executing instruction; power to the CPUs and random access memory (RAM) is maintained; devices that do not indicate they must remain on may be powered down);
  S2 (e.g., central processing unit (CPU) powered off);
  S3 (e.g., commonly referred to as Standby, Sleep, or Suspend to RAM. RAM remains powered);
  S4 (e.g., Hibernation or Suspend to disk; all content of main memory is saved to non-volatile memory such as a hard drive, and is powered down);
 G2 (S5) Soft Off (e.g., G2, S5, and Soft Off are synonyms; G2 is almost the same as G3 Mechanical Off, but some components remain powered so the computer can "wake" from input from the keyboard, clock, modem, LAN, or USB device);
 G3 Mechanical Off (e.g., the computer's power consumption approaches close to zero, to the point that the power cord can be removed and the system is safe for disassembly (typically, only the real-time clock is running off its own small battery)).

In an example, the host device can include one or more components of the systems, apparatus, or methods described herein. In an example, the control circuit can be configured to receive information about a peripheral device, the charging emulator can configure the electrical interface to charge the peripheral device, or the charger circuit can be configured to provide power to the electrical interface when the host device is in any one of the seven ACPI power states.

In an example, the host device can include a notebook PC or other electronic device including a battery. In an example, the control circuit can be configured to receive information about a peripheral device, the charging emulator can configure the electrical interface to charge the peripheral device, or the charger circuit can be configured to provide power to the electrical interface when the notebook PC is off but a power cord is plugged into a power source, or when the notebook PC is off and the power cord is removed but there is at least some battery charge remaining.

Additional Notes

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In other examples, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. An apparatus comprising:
   a control circuit configured to receive information about a peripheral device coupled to a USB interface including a data plus (D+) line and a data minus (D−) line;
   a charging emulator to configure the electrical interface to charge the peripheral device using a Universal Serial Bus (USB) battery charging specification mode or a non-USB battery charging specification mode according to information from the control circuit;
   wherein the charging emulator is capable of emulating the USB battery charging specification mode and the non-USB battery charging specification mode;
   wherein the charging emulator is configured to couple each of the D+ and D− lines of the USB interface to a voltage divider in the non-USB battery charging specification mode.

2. The apparatus of claim 1, including the USB interface configured to couple to the peripheral device.

3. The apparatus of claim 1, including:
   a charger circuit configured to provide power to the electrical interface using the received peripheral device information; and
   a host device, wherein the host device includes an electronic device including a low-power state, and wherein the host device includes the charging emulator;
   wherein the charger circuit is configured to provide power to the electrical interface when the host device is in the low-power state;
   wherein the low-power state includes at least one of a hibernation, a stand-by, a sleep, a suspended, or an off-state.

4. The apparatus of claim 1, wherein the information about the peripheral device coupled to the electrical interface includes a current draw of the peripheral device.

5. The apparatus of claim 1, wherein the charging emulator is configured to configure the electrical interface to charge the peripheral device using the USB battery charging specification mode for a first period of time;
   wherein the control circuit is configured to determine, after the first period of time, if a current draw of the peripheral device is below a first threshold using the received information about the peripheral device; and
   wherein, after the first period of time, the charging emulator is configured to reconfigure the electrical interface to charge the peripheral device using the non-USB battery charging specification mode if the current draw of the peripheral device is below the first threshold.

6. The apparatus of claim 5, wherein the control circuit is configured to determine, after the first period of time, if a current draw of the peripheral device is above the first threshold using the received information about the peripheral device; and
   wherein, after the first period of time, the charging emulator is configured to retain the USB battery charging specification mode if the current draw of the peripheral device is above the first threshold.

7. The apparatus of claim 5, wherein the first threshold is 100 mA.

8. The apparatus of claim 5, wherein the control circuit is configured to determine, after a second period of time, if the current draw of the peripheral device is below the first threshold using the received information about the peripheral device; and wherein, after the second period of time, the charging emulator is configured to reconfigure the electrical interface to charge the peripheral device using the USB battery charging specification mode if the current draw of the peripheral device is below the first threshold.

9. The apparatus of claim 1, wherein the USB battery charging specification mode includes at least one of a dedicated charging port (DCP) mode, a charging downstream port (CDP) mode, or a standard downstream port (SDP) mode.

10. The apparatus of claim 1, wherein the charging emulator includes the voltage divider.

11. The apparatus of claim 1, wherein the non-USB battery charging specification mode includes a voltage divider mode.

12. A system comprising:
a host device including an electronic device including a low-power state, the low-power state including at least one of a low-power, a hibernation, a stand-by, a sleep, or a suspended state, the host device including:
a Universal Serial Bus (USB) interface configured to couple to a peripheral device; wherein the USB interface includes a data plus (D+) line and a data minus (D−) line,
a control circuit configured to determine a charging characteristic of the peripheral device; and
a charging emulator coupled to the USB interface, the charging emulator configured to be operable when the host device is in the low-power state, capable of emulating a USB battery charging specification mode and a non-USB battery charging specification mode, and configured to configure the USB interface to charge the peripheral device using the USB battery charging specification mode or the non-USB battery charging specification mode according to the determined charging characteristic, wherein the USB battery charging specification mode includes at least one of a dedicated charging port (DCP) mode, a charging downstream port (CDP) mode, or a standard downstream port (SDP) mode, and wherein the non-USB battery charging specification mode includes a voltage divider mode and wherein the charging emulator is configured to couple each of the D+ and D− lines of the USB interface to the voltage divider in the non-USB battery charging specification mode.

13. The system of claim 12, wherein the control circuit is configured to determine the charging characteristic of the peripheral device and to charge the peripheral device when the host device is in the low-power state.

14. The system of claim 12, wherein the charging emulator is configured to configure the electrical interface to charge the peripheral device using the USB battery charging specification mode for a first period of time;
wherein the control circuit is configured to determine, after the first period of time, if a current draw of the peripheral device is below a first threshold using the received information about the peripheral device; and
wherein, after the first period of time, the charging emulator is configured to reconfigure the electrical interface to charge the peripheral device using the non-USB battery charging specification mode if the current draw of the peripheral device is below the first threshold.

15. The system of claim 14, wherein the control circuit is configured to determine, after the first period of time, if a current draw of the peripheral device is above a first threshold using the received information about the peripheral device; and
wherein, after the first period of time, the charging emulator is configured to retain the USB battery charging specification mode if the current draw of the peripheral device is above the first threshold.

16. A method comprising:
receiving information about a peripheral device coupled to a USB interface including a data plus (D+) line and a data minus (D−) line;
configuring, using a charging emulator, the electrical interface to charge the peripheral device using a Universal Serial Bus (USB) battery charging specification mode or a non-USB battery charging specification mode according to the received peripheral device information wherein the charging emulator is capable of emulating the USB battery charging specification mode and the non-USB battery charging specification mode; and
coupling each of the D+ and D− lines of the USB interface to a voltage divider in the non-USB battery charging specification mode.

17. The method of claim 16, including determining a characteristic of the peripheral device using the received peripheral device information; and
wherein the configuring the electrical interface to charge the peripheral device includes using the determined characteristic.

18. The method of claim 16, wherein the receiving information about the peripheral device includes receiving information about the peripheral device when a host device is in a low-power state; and
wherein the low-power state includes at least one of a low-power, a hibernation, a stand-by, a sleep, or a suspended state.

19. The method of claim 16, including:
configuring the electrical interface to charge the peripheral device using the USB battery charging specification mode for a first period of time;
determining, after the first period of time, if a current draw of the peripheral device is below a first threshold using the received information about the peripheral device; and
reconfiguring the electrical interface to charge the peripheral device using the non-USB battery charging specification mode if the current draw of the peripheral device is below the first threshold.

20. The method of claim 19, including:
determining, after the first period of time, if a current draw of the peripheral device is above the first threshold using the received information about the peripheral device; and
retaining the USB battery charging specification mode if the current draw of the peripheral device is above the first threshold.

21. The method of claim 19, wherein the first threshold is 100 mA.

22. The method of claim 19, including:
determining, after a second period of time, if the current draw of the peripheral device is below the first threshold using the received information about the peripheral device; and
reconfiguring the electrical interface to charge the peripheral device using the USB battery charging specification mode if the current draw of the peripheral device is below the first threshold.

23. The method of claim 16, wherein the USB battery charging specification mode includes at least one of a dedicated charging port (DCP) mode, a charging downstream port (CDP) mode, or a standard downstream port (SDP) mode.

24. The method of claim 16, wherein the charging emulator includes the voltage divider.

* * * * *